United States Patent [11] 3,567,872

[72] Inventor Sundaram Narayanan
Lawrence, Mass.
[21] Appl. No. 831,563
[22] Filed June 9, 1969
[45] Patented Mar. 2, 1971
[73] Assignee Bell Telephone Laboratories Incorporated
Murray Hill, N.J.

[54] THIRD ORDER COMPENSATION IN REPEATERED TRANSMISSION LINES
5 Claims, 11 Drawing Figs.

[52] U.S. Cl. ........................................ 179/170
[51] Int. Cl. ........................................ H04b 3/36
[50] Field of Search ........................................ 179/170,
170 (C), 170 (E), 170 (T)

[56] References Cited
UNITED STATES PATENTS
3,180,938 4/1965 Glomb ........................ 179/170X

*Primary Examiner*—Kathleen Claffy
*Assistant Examiner*—William A. Helvestine
*Attorneys*—R. J. Guenther and E. W. Adams, Jr.

ABSTRACT: In a repeatered transmission line, in-phase addition of third order intermodulation products is prevented to greatly reduce accumulated intermodulation noise. With this system, some repeater amplifiers are adapted by manipulation of bias voltage and load resistance to generate these products in opposite phase relation to those generated by the remaining repeaters, thereby causing cancellation.

INVENTOR
S. NARAYANAN
BY John P. Mc Donnell
ATTORNEY

THIRD ORDER COMPENSATION IN REPEATERED TRANSMISSION LINES

BACKGROUND OF THE INVENTION

This invention relates to the transmission of frequency division multiplexed signals and particularly to the reduction of intermodulation noise generated by repeaters.

In the transmission of telephone signals, it is typical to transmit simultaneously many separate telephone conversations over a single electrical conductor pair or cable in frequency division multiplex form. Each conversation is modulated on to one of several separate channel carrier frequencies to form a channel group. Several groups may then in turn be further modulated on to higher frequency carriers of wider bandwidth to form super groups and master groups. In this manner, channels are provided for hundreds of conversations over a single transmission line. In order to maintain the amplitude of the signals at a usable level over long distances, repeaters, which include signal amplifiers, must be inserted periodically along the cable. As is the case with all amplifiers, however, any nonlinearity in the characteristic of the repeater causes intermodulation between the various signals and thereby generates noise in the form of intermodulation products at the sum and difference frequencies of all the various combinations of input signals. While the intermodulation noise level generated by any one repeater is very slight, hundreds of repeaters are required on long lines, and the noise generated by each repeater which lies within the repeater bandwidth is amplified by all subsequent repeaters. Each particular modulation product therefore adds to those of the same frequency which were generated by previous repeaters along the line. Second order products, that is, those which are the second harmonic of a signal frequency or the sum or the difference of two signal frequencies do not add in-phase and tend to cancel to some degree, as will be explained later. Certain third order products on the other hand, do add approximately in-phase, so that the noise component at the end of the repeated line is the algebraic sum of the components generated by each repeater at the particular third order product frequency. Although the amplitude of third order products generated by a single repeater is less than the amplitude of second order products, the cumulative amplitude after in-phase addition by a substantial number of repeaters is greater. This gives rise to a very strict third order intermodulation distortion requirement as a limiting requirement for repeaters. Typically, the requirement is met through the use of a large amount of feedback. In addition, the transistors are operated at relatively high current, high voltage conditions to minimize distortion. Feedback, of course, reduces the overall gain of an amplifier and at the same time limits gain-bandwidth product. Reduction of the cumulative third order modulation products, therefore, allows less feedback in each repeater and provides a greater bandwidth for handling more telephone conversations. High current and voltage transistor operating conditions require additional DC power to be supplied to each repeater, usually through the transmission line, in addition to generating excess heat that must be removed for reliable transistor operation. In long lines with many repeaters the DC power requirement can be very serious. Reduction of cumulative third order intermodulation products allows a reduction in the DC power requirement per repeater.

An object of this invention is to increase the usable bandwidth of a repeatered transmission path by the reduction of cumulative third order intermodulation products.

Another object is to reduce the DC power required by each repeater of a repeatered transmission path.

SUMMARY OF THE INVENTION

According to the present invention, some of the repeater amplifiers in a transmission path are adapted so that the third order intermodulation products they generate at least partially cancel the third order intermodulation products generated by the remaining repeater amplifiers in the path. Cancellation takes place because the third order products generated by the adapted repeater amplifiers differ in phase from those generated by the others. The adaption required to produce this result may be only a change in the load resistance or bias voltage of the last transistor stage.

DETAILED DESCRIPTION

Figure 1:
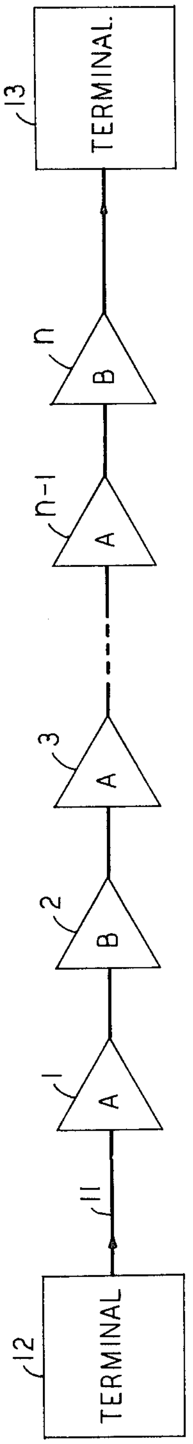
FIG. 1 is a block diagram of an embodiment of the invention utilizing repeaters of two types alternating in position along the transmission line.

In the embodiment of the invention shown in FIG. 1, a long distance telephone line 11 for carrying frequency division multiplex signals between two terminals 12 and 13, includes a series of repeaters 1, 2, 3...*n*-1, and *n*, equally spaced along the line. Unlike the typical lines of the prior art, the repeaters are not identical; they are of two types, A and B. The repeaters A and B differ in one important feature; the phase angle at which the third order intermodulation products of the type $e(f_1+f_2-f_3)$ are generated by the A repeaters differs sufficiently from that at which similar products are generated by the B repeaters, both with respect to the phase of the signal $e(f_1)$, to prevent in-phase addition. As will be shown, as the difference in phase angle approaches 180°, the overall intermodulation noise introduced by line 11 is significantly reduced, and at a difference of 180° it is at least theoretically possible to provide total cancellation of the third order products.

Figures 2A, 2B, 2C, 2D, 3A, 3B:
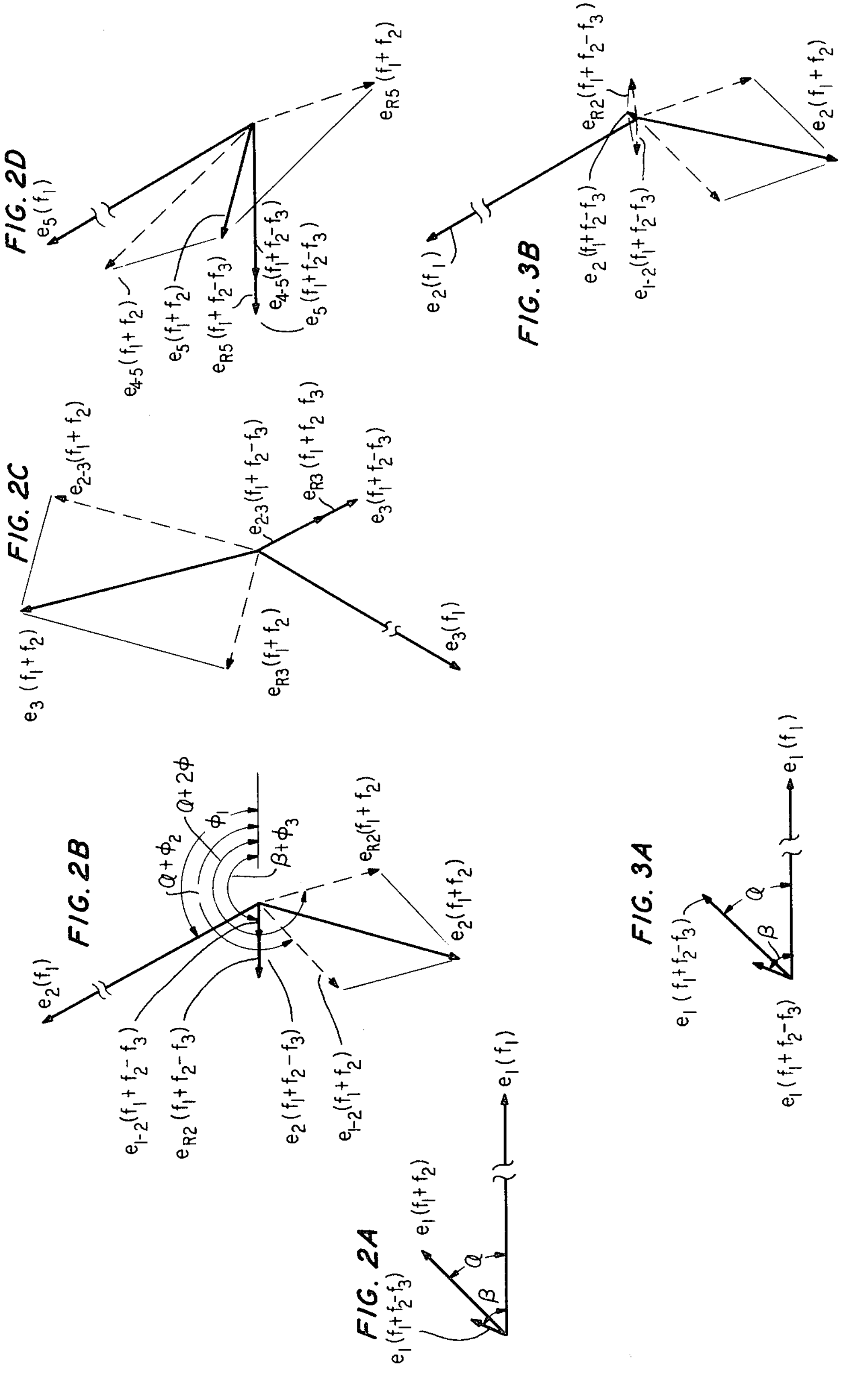
FIGS. 2A through 2D are vector diagrams illustrating the addition of second and third order intermodulation products in a conventional repeatered line.
FIGS. 3A and 3B are vector diagrams illustrating addition of third order products in a repeatered line constructed according to the principles of the invention.

FIG. 2 illustrates the manner in which second and third order intermodulation products accumulate along a conventional transmission line which uses all identical repeaters uniformly spaced. Consider a single signal of frequency $f_1$ and typical modulation products generated by its interaction with adjacent signals of frequency $f_2$ and $f_3$, all from a single multiplex group. The vector diagram of FIG. 2A represents voltage magnitude and phase relationships that exist at the output of the first repeater. The vector $e_1(f_1)$ represents the magnitude and phase of the signal at frequency $f_1$. Similarly, a vector $e_1(f1+f_2)$ represents the second order intermodulation product of frequency $(f_1+f_2)$, and a vector $e_1(f_1+f_2-f_3)$ represents the third order product of frequency $(f_1+f_2-f_3)$ both generated by the inherent nonlinearities in the repeater. Since the three vectors represent voltages at three different frequencies, their phases cannot be compared. We will observe, however, the shift in phase and magnitude that occurs to each voltage as it traverses each section of line and repeater. In order to separate the vectors for illustration, $e_1(f_1+f_2)$ has been shown at a reference angle $\alpha$ lagging the position of $e_1(fK)$; $e_1(f_1+f_2-f_3)$ lies at a reference angle $\beta$. The vector $e_1(f_1)$, representing the signal, is shown broken because it is of much greater magnitude and not to the same scale as the second and third order product vectors.

FIG. 2B shows the relationships that exist at the output of the second repeater. In a typical repeatered line, the repeaters are designed to have just the necessary gain to restore the signal amplitude that is lost through the attenuation in the section of line between repeaters. In such a line, a phase shift is imparted to signals traversing each section of line and repeater combination which is approximately a linear function of frequency, but is not directly proportional to frequency. Hence, the higher the frequency, the greater the phase shift, but a frequency twice a given frequency would undergo less than twice the phase shift of the given frequency. Each of the three voltages depicted in FIG. 2A, therefore, has been shifted in phase by travelling through the section of line between the first and second repeaters, and its amplitude has been restored by the second repeater to what it was at the output of the first repeater. Since frequencies $f_1$, $f_2$ and $f_3$ are all close in value, second order product frequencies $(f_1+f_2)$ and $2f_1$ are approximately twice the frequency of the signal $f_1$, while the third order product frequencies $(f_1+f_2-f_3)$ and $(2f_1-f_2)$ are close to the value of the signal frequency $f_1$. The amount of phase shift being a linear function of frequency, therefore, the angle $\Phi$, by which the signal vector $e_1(f_1)$ was shifted to become $e_2(f_1)$, is approximately equal to $\Phi_3$, by which $e_1(f_1+f_2-f_3)$ was shifted to become $e_1-_2(f_1+f-f_3)$. $\Phi_2$, by which $e_1(f_1+f_2)$ was shifted to become $e_1-_2(f_1+f)$, on the other hand, is considerable larger than $\Phi_1$ or $\Phi_3$, but less than twice as large.

The nonlinearities of the second repeater generate second and third order intermodulation products just as the first repeater did. These products are designated by the subscript $R_2$ in FIG. 2B. The phase at which these products are generated relative to the phase at which similar products were generated in the previous repeater is shifted by an amount equal to the combined amounts that the contributing signals were shifted. That is, if the signal $e(f_1)$ was shifted by the angle $\Delta_1$, and $e(f_2)$ was shifted by $\Delta_2$, the product $e(f_1+f_2)$ is shifted by the angle $(\Delta_1+_2)$. Similarly, the product $e(f_1+f_2-f_3)$ is shifted by the angle $(\Delta_1+\Delta_2-\Delta)$. But since, as mentioned before, frequencies $f_1$, $f_2$ and $f_3$ are very close to one another, $\Delta_1$, $\Delta_2$ and $\Delta_3$ are approximately the same angle $\Phi$. The vector $e_{R2}$ $(f_1+f_2)$ therefore is shifted with respect to $e_1(f_1+f_2)$ by an angle approximately $2\Phi$ while $e_{R2}(f+f_2-f_3)$ is shifted with respect to $e_1(f_1+f_2-f_3)$ by an angle approximately equal to $\Phi$. The resultant sum second and third order products are found by performing the vector addition; the vectors $e_1-_2(f_1+f)$ and $e_{R2}(f1+f_2)$ add to become the vector $e_2(f_1+f_2)$, and the vectors $e_1-_2(f_1+f_2-f_3)$ and $e_{R2}(f+f_2-f_3)$ add to become $e_2(f_1+f_2-f_3)$. It can now be seen that the angle at which the third order product $e_{R2}(f+f_2-f_3)$ is generated by repeater 2 is approximately the same as the angle through which the third order product $e_1(f_1+f_2-f_3)$ is shifted by passage from the output of repeater 1 to the output of repeater 2. In contrast, the angle $2\Phi$ at which the second order product $e_{R2}(f+f_2)$ is generated differs significantly from the angle $\Phi_2$ through which the product $e_1(f_1+f_2)$ is shifted by the same passage.

Further phase shift is imparted to the signal $e(f_1)$ and the resultant sum second and third order distortion products as they traverse the section of line between the second and third repeaters, and further distortion products are added by the third repeater to produce the intermodulation products represented by the vectors of FIG. 2C. The third order product $e(f_1+f_2-f_3)$ vectors have continued to add in-phase, while the second order product $e(f_1+f_2)$ vectors are slowly slipping out-of-phase to a greater degree. FIG. 2D shows the addition of second and third order products at the output of the fifth repeater. From FIG. 2D it is readily seen that the vector $e(f_1)$ remains at its original magnitude due to the repeater action of maintaining this amplitude as discussed heretofore. The magnitude of the second order product vector $e(f_1+f_2)$, however, is beginning to diminish because the second order product generated by the fifth repeater $e(f_1+f_2)_{R7}$ is almost 180° out-of-phase with the cumulative second order product at the fifth repeater. The third order product vector $e(f_1+f_2-f_3)$, on the other hand, has continued to add in-phase through all five repeaters and its magnitude is now considerably larger than the magnitude of the originally larger second order product vector.

It can thus be seen that because the frequency of the third order intermodulation products is very close to the signal frequency, the third order products tend to add in-phase and to become a dominant source of noise.

According to the principles of this invention, as embodied in the structure of FIG. 1, such in-phase addition is prevented because the phase angle at which third order products are generated in the A repeaters differs from the angle at which they are generated in the B repeaters. FIG. 3 illustrates the subtraction of these products.

FIG. 3A depicts the magnitudes and phases at the output of repeater 1, an A type repeater in FIG. 1. For the sake of illustration, they may be the same as those depicted in FIG. 2A, with second order product $e_1(f_1+f_2)$ at reference angles $\alpha$ and third order product $e_1(f_1+f_2-f_3)$ at angle $\beta$. FIG. 3B shows the vector relationships at the output of the repeater 2, a type B repeater in FIG. 1. The transmitted signal and the second order product $e_2(f_1+f_2)$ are approximately the same as in the typical case of FIG. 2. Additionally, the third order product vector $e_1(f_1+f_2-f_3)$ of repeater 1 has been shifted by the same angle $\Phi$ due, $\Phi$ before, to characteristics of the transmission line to become $e_1+_2(f_1+f-f_3)$ at the second repeater. According to the principles of the present invention, the B repeater is adapted so that the phase of the third order product it generates, $e_{R2}(f+f_2-f_3)$, differs from that of the third order product generated by an A repeater using the same input signals. If the difference is 180°, the vector addition of the third order products provides cancellation. The third order distortion then ceases to be a limiting feature of repeater design. In a practical case, any difference in the phase angle of the third order products generated by type A and type B repeaters produces some worthwhile improvement, and a difference of between 120° and 240° is sufficient to relieve the noise limitations imposed by the third order products.

In the embodiment of FIG. 1, third order product cancellation is provided after each pair of dissimilar repeaters. It is also, of course, feasible and within the contemplation of the invention to provide a section of transmission line having several type A repeaters in succession and another section having several type B repeaters, which may be a lesser number, in succession. Minimum third order distortion would then be realized after a pair of sections of the same length. As long as the repeaters do not generate the third order products in-phase with respect to each other, then the accumulated third order distortion is reduced.

It has been found that the phase of the third order intermodulation products produced by a transistor amplifier may readily be shifted without a great change in the phase shift of the signal being transmitted by manipulation of the transistor load resistance and bias voltage. The phase of the third order products may be calculated by the use of well-known circuit analysis techniques. One such technique is described in my article "Transistor Distortion Analysis Using Volterra Series Representation" in the Bell System Technical Journal, Vol. XLVI No. 5, May–Jun., 1967, page 991. The equivalent circuit used for the transistor must, of course, take into account the nonlinearity which gives rise to intermodulation distortion.

Figure 4:
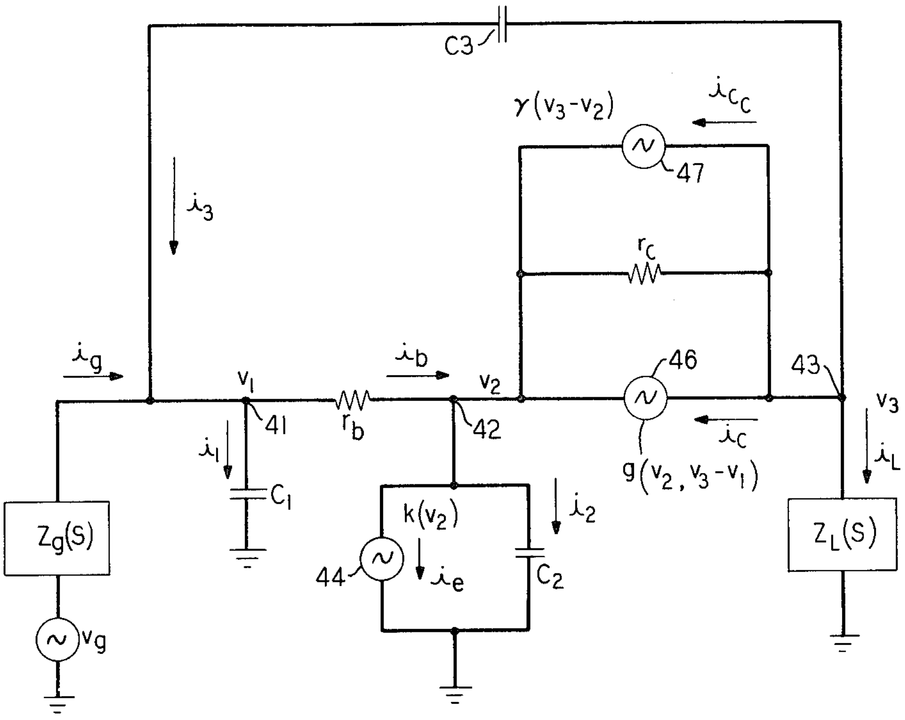
FIG. 4 is a transistor nonlinear equivalent circuit useful for calculating third order product phase.

A suitable nonlinear equivalent circuit for a transistor connected in common emitter configuration is diagrammed in FIG. 4. As shown in the diagram, the circuit includes three junction points, 41, 42 and 43, which represent base, internal and collector connections, respectively, the emitter connection being grounded. The voltages at the three points are labeled $v_1$, $v_2$ and $v_3$, respectively. The exponential nonlinearity that relates emitter current to emitter voltage is accounted for in the diagram by a voltage dependent emitter current generator 44 connected between junction point 42 and ground. The emitter current vs. emitter voltage characteristic of the particular transistor may be expressed in a Taylor series expansion of the form $$i_e=k(v_2)=k_1v_2+k_2v_2^2+k_3v_2^3.$$

Current generator 44 is therefore labeled $k(v_2)$. Emitter capacitance $C_2$ shunts current generator 44.

Avalanche and $h_{FE}$ nonlinearities are represented by a collector current generator 46 connected between junction points 42 and 43 in parallel with collector resistance $R_c$. The nonlinearity of collector current due to avalanche effect is a function of collector to base voltage, $v_3-v_1$ (at higher voltage values); that due to $h_{FE}$ is a function of emitter current, $i_e$ (at higher current values). Since the relationship between emitter current and emitter voltage was given above, the $h_{FE}$ nonlinearity may be expressed as a function of emitter voltage, $v_2$. Hence, the collector current generator is labeled $g(v_2, v_3-v_1)$.

Finally, the collector capacitance is a nonlinear function of collector-to-base voltage. It is therefore represented in the diagram of FIG. 4 by the collector capacitance current generator 47 connected between junction points 42 and 43 and labeled $\gamma(v_3-v_2)$.

The load impedance transform $Z_L(S)$ is, of course, connected between point 43 and ground, and an input voltage generator $v_g$ in series with the input impedance transform $Z_g(S)$ is connected between junction point 41 and ground. Collector to base capacitance $C_3$ is connected between points 41 and 43 and base-emitter capacitance $C_1$ is connected between point 41 and ground.

With the four sources of nonlinearity expressed in terms of the three currents $i_e$, $i_c$, and $i_{c_0}$ as Taylor series based on measured transistor parameters, current and voltage equations can be written for the circuit and solved by computer. When input voltage $v_g$ includes the three frequencies $f_1$, $f_2$, and $f_3$, the magnitude and phase of the linear and the third order transfer functions may be calculated. The Volterra method described in my previously mentioned article yields this information conveniently, but other well-known methods may be used successfully.

Figure 5A:
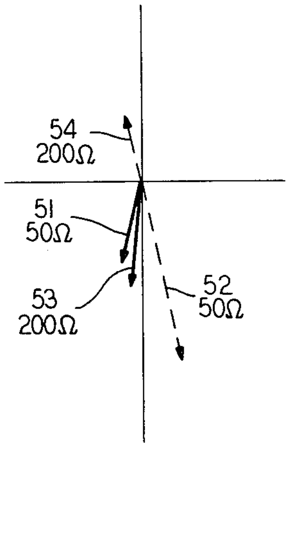
FIGS. 5A and 5B are vector diagrams illustrating the shifting of phase brought about by changes in load resistance and bias voltage.
Figure 5B:
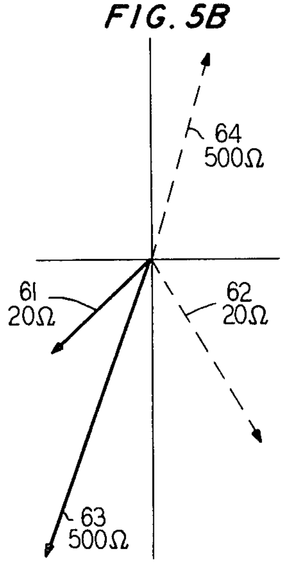

The polar plots of FIGS. 5A and 5B show the results of such calculations. FIG. 5A shows the vectors representing the linear and third order transfer functions calculated for a typical power transistor with two different values of load resistance. The input frequencies used were $f_1$ = 50 mHz., $f_2$ = 40.1 mHz. and $f_3$ = 43.1 mHz.; the third order output frequency ($f_1+f_2-f_3$) is therefore equal to 47.0 mHz. The DC bias conditions used for determining the transistor parameters were 100 milliampere emitter current and 10 volts collector-to-base voltage. Solid vector 51 represents the calculated magnitude and phase of the linear transfer function of the transistor stage at the $f_3$ frequency 43.1 mHz. with a value of load resistance equal to 50 ohms, while the dotted vector 52 represents the calculated third order transfer function at 47.0 mHz. It is, of course, impractical to plot vectors 51 and 52 to the same scale, as the magnitude of the third order transfer function is only one-twentieth of the magnitude of the linear transfer function. Vectors 53 and 54 represent the calculated values of the same respective transfer functions with the load resistance changed to 200 ohms. It can readily be seen that the phase and magnitude of the linear transfer function represented by solid vectors has been only slightly shifted, while the phase of the third order transfer function represented by dotted vectors has been shifted about 180° and its magnitude halved. The combination of an amplifier with 500 ohms load resistance and another similar amplifier with 200 ohms load resistance therefore produces considerable third order cancellation.

The effect of a higher collector to base bias voltage on the sensitivity of third order phase change with load resistance can be seen by a comparison between FIGS. 5A and 5B. For the purpose of calculating the magnitude and phase of the linear and third order transforms for FIG. 5B a collector-to-base bias voltage of 15 volts was used. In addition, an even greater spread of load resistance, 20 ohms and 500 ohms, were used. Vectors 61 and 62, therefore, represent the linear and third order transfer function respectively with 20 ohms load resistance, while vectors 63 and 64 represent the transfer functions of the two respective signals with 500 ohms load resistance. It is obvious that the shift in phase of the second order transfer function with load resistance at 15 volts bias, FIG. 5B, was less than that at 10 volts bias, FIG. 5A, while the shift in this phase of the linear transfer function was greater. Although the amount of phase shift is not as great, similar third order phase shifts can be obtained in the common base and common collector configurations.

Typical bias values for optimum modulation noise performance of individual amplifiers of the type used are 100 milliampere emitter current and 15 volts collector-to-base bias. This represents 1½ watts dissipation in the transistor. Equivalent performance of a repeated line can be obtained through the practice of this invention if one type repeater amplifier is biased at 100 milliamperes, 5 volts (RL = 200 ohms) and the other at 50 milliamperes, 10 volts (RL = 18.75 ohms). This is an average of only ½watt dissipation per transistor. A saving of 1 watt per repeater in DC power that must be transmitted over a long line is very significant.

The greatest third order product phase shift apparently occurs when the operating conditions are shifted between those where the voltage dependent nonlinearities predominate and those where the current dependent nonlinearities predominate. The amount of current dependent nonlinearity may be controlled at a given power output by varying the load resistance. At a low load resistance, therefore, a large current swing exists for the same power output, and the current dependent nonlinearity is high. The voltage dependent nonlinearity, which is due in part to collector capacitance, is greatest at low bias voltage. Therefore, if low emitter-collector voltage is used, and the load resistance is shifted over a four to one range, a large third order product shift occurs.

In a multistage repeater amplifier including one with an overall feedback loop, it is generally sufficient to manipulate only the last stage, since that stage generates signals of by far the greatest magnitude.

Figure 6:
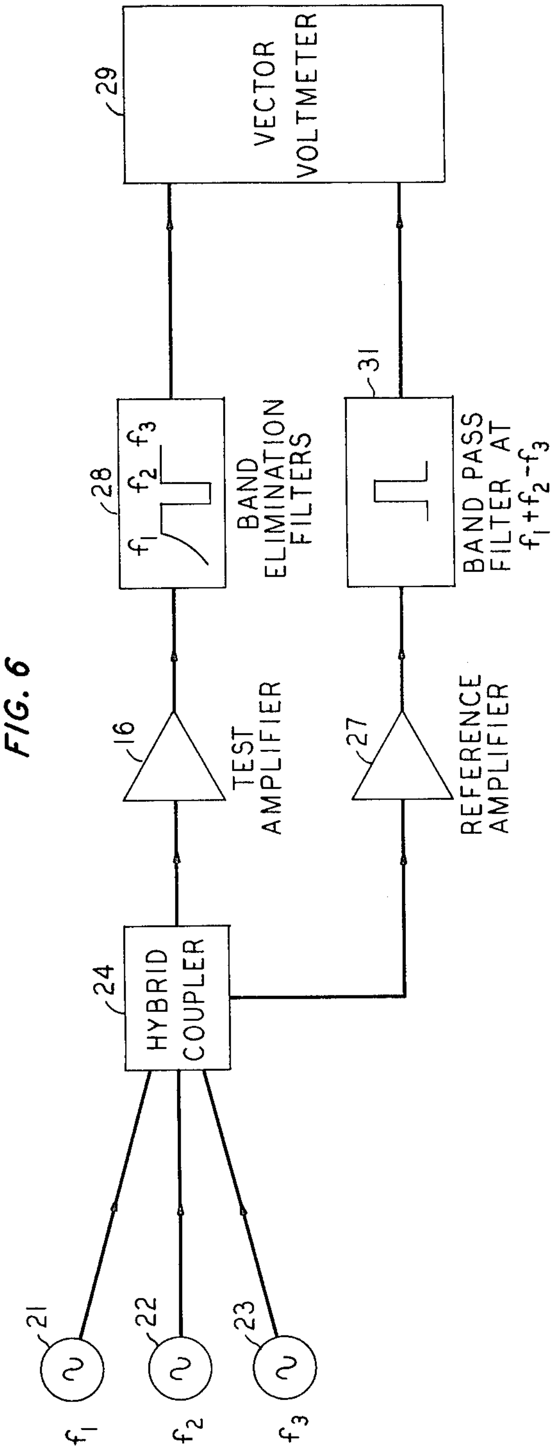
FIG. 6 is a block diagram of a test circuit useful for measuring changes in third order phase.

The test circuit shown in FIG. 6 may be used to measure the change in third order product phase brought about by manipulation of transistor bias voltage and load resistance according to the principles of the invention. Three signal generators 21, 22 and 23 of adjacent carrier frequencies $f_1$, $f_2$ and $f_3$, respectively, are connected through a hybrid coupler 24 to the amplifier under test 26 and a reference amplifier 27. The output of reference amplifier 27 is connected through a band-pass filter 31 to one input of a vector voltmeter 29. The output of the amplifier under test 26 is connected through a cascade of band elimination filters 28 to the other input of vector voltmeter 29. Band-pass filter 31 is sharply tuned to pass only the frequency of the third order product under investigation, $f_1+f_2-f$, so that vector voltmeter 29 will lock onto the proper frequency. The band elimination filters of cascade 28 are sharply tuned to eliminate the fundamental frequencies $f_1$, $f_2$ and $f_3$ so that they will not mask the desired third order product. Vector voltmeter 29 may be example, Hewlitt-Packard model No. 8405A. The third order product $f_1+f_2-f_3$ generated by reference amplifier 27 provides the necessary phase reference of the proper frequency into vector voltmeter 29 so that changes in phase of the product of the same frequency by generated test amplifier 26 can be detected. Vector voltmeter 29 reads directly the phase difference between the reference third order product generated by amplifier 27 and that of the product generated by the test amplifier, as well as the amplitudes of both products for each set of conditions. Obviously, this circuit may be used to design empirically repeaters according to the principles of my invention without the necessity of long calculations.

I claim:

1. A transmission system comprising a first and a second plurality of repeater amplifiers serially connected in a transmission path for the transmission of a plurality of signals in multiplex form, wherein said first and second pluralities of repeater amplifiers inherently generate third order intermodulation products from said plurality of multiplexed signals, said second plurality of repeater amplifiers being adapted to generate third order intermodulation products which at least partially cancel the third order intermodulation products generated by said first plurality of repeater amplifiers.

2. A transmission system as in claim 1 wherein the third order intermodulation products generated by said second plurality of repeater amplifiers differ in phase from the third order intermodulation products generated by said first plurality of repeater amplifiers by an amount between 120° and 240°.

3. A transmission system as in claim 1 wherein individual ones of said first plurality of repeater amplifiers occupy alternating consecutive positions with individual ones of said second plurality of repeater amplifiers along said transmission path.

4. A transmission system as in claim 2 wherein each amplifier of said first and second pluralities of repeater amplifiers includes a final transistor-amplifying stage, the load resistance of the final transistor-amplifying stage of said first plurality of repeater amplifiers being at least twice as large as the load resistance of the final transistor amplifying stage of said second plurality of repeater amplifiers.

5. A transmission system for transmitting a plurality of signals in frequency division multiplex form comprising a plurality of similar repeater amplifiers, each including a transistor-amplifying stage having a load resistance, and each transistor-amplifying stage inherently generating third order intermodulation products from said plurality of signals, characterized in that the transistor-amplifying stage load resistance of at least some of said plurality of repeater amplifiers is more than twice as large as the transistor-amplifying stage load resistance of at least others of said plurality of repeater amplifiers, whereby the third order intermodulation products generated by said some of said plurality of repeater amplifiers at least partially cancel the third order intermodulation products generated by said others of said plurality of repeater amplifiers.